R. GARRETT.
TIRE PUMP.
APPLICATION FILED FEB. 12, 1921.
1,417,163.
Patented May 23, 1922.
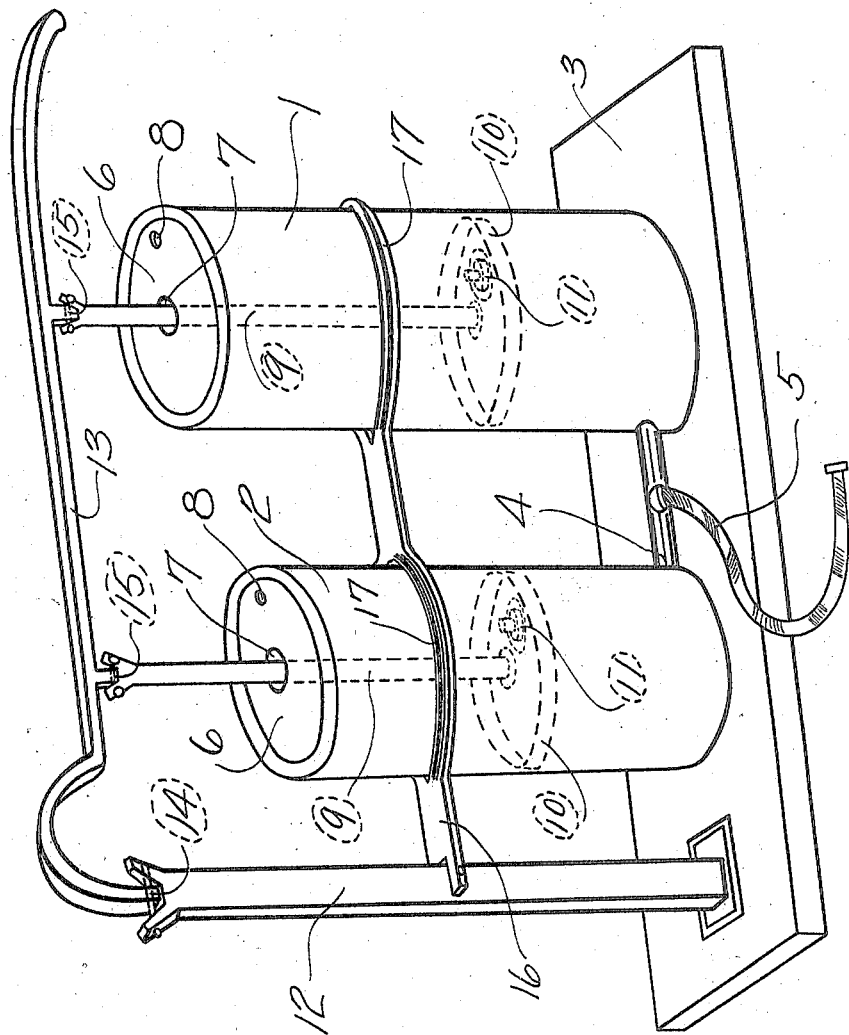
INVENTOR:
Ray Garrett
BY:
Adam E. Fisher
ATTORNEY:

UNITED STATES PATENT OFFICE.

RAY GARRETT, OF BURNS CITY, INDIANA.

TIRE PUMP.

1,417,163.　　　　Specification of Letters Patent.　　Patented May 23, 1922.

Application filed February 12, 1921. Serial No. 444,375.

*To all whom it may concern:*

Be it known that I, RAY GARRETT, a citizen of the United States, residing in Burns City and State of Indiana, have invented new and useful Improvements in Tire Pumps, of which the following is a specification, reference being had to the accompanying drawings.

This invention is in the way of a tire pump for inflating pneumatic automobile tires, or for like purposes.

The object is to provide a simple and efficient two-cylinder pump, having one cylinder shorter than the other so as to equalize the strokes of the pistons.

The drawing shows a perspective view of the pump.

The invention consists in mounting two unequal pump cylinders 1 and 2 on a base 3 and connecting them interiorly by a tube 4. A connecting hose 5 leads to the tire to be inflated. The cylinder 1 is longer than the cylinder 2 and the top ends 6 are closed, except for the piston holes 7 and air vents 8. These cylinders are equipped with the usual piston rods 9, pistons 10 and air valves 11 on the pistons adapted to admit air below the pistons on the up-stroke and to close on the down stroke so as to force air out through the hose 5. A handle post 12 is mounted on the base 3 spaced from the shorter cylinder 2 and in alignment with the two cylinders. A handle 13 is pivoted at 14 to the top of this post and is extended over and pivoted to the upper ends of the piston rods 9 at the points 15. An additional brace 16 may be extended out from the post 12 and engage the cylinders by means of rings 17 interposed in the brace.

This two cylinder pump may be operated easily by one hand and the cylinders are so proportioned that their pistons, moving at unequal speed, will both reach the top and bottom of their respective cylinders simultaneously.

While I have herein described a certain specific method of constructing and assembling the elements of my invention, it is understood same may be varied in minor details, not departing from the spirit of my invention as defined in the appended claim.

What I claim to be new and patentable is:

A two cylinder tire pump, comprising a base; a handle post extended vertically from the base; a relatively short pump cylinder on the base adjacent the handle post; a relative long pump cylinder on the base and aligned with the handle post and short cylinder; an air tube interiorly connecting the cylinders near their bases; valved pistons mounted in the cylinders; piston rods extended from the pistons slidingly out through the tops of the cylinders; and a handle pivotally connected to the ends of the handle post and piston rods.

RAY GARRETT.

Witnesses:
ROLLA GARRETT,
LINCOLN LANKFORD.